US 7,054,652 B2

(12) United States Patent
Luis

(10) Patent No.: US 7,054,652 B2
(45) Date of Patent: May 30, 2006

(54) NUMBER PORTABILITY RESOLVING APPARATUS

(75) Inventor: Elena Goicoechea Luis, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 353 days.

(21) Appl. No.: 10/282,344

(22) Filed: Jan. 7, 2003

(65) Prior Publication Data

US 2004/0242243 A1    Dec. 2, 2004

(30) Foreign Application Priority Data

Nov. 6, 2001    (EP) ................................. 01126344

(51) Int. Cl.
*H04Q 7/20* (2006.01)
(52) U.S. Cl. .................. 455/461; 455/433; 455/552.1; 379/221.09; 379/221.12
(58) Field of Classification Search ................ 455/461, 455/422.1, 433, 436, 435.1, 435.2, 444, 432.1, 455/432.2, 552.1, 445; 370/356, 352; 379/221.08, 379/221.09, 221.12, 221.13
See application file for complete search history.

(56) References Cited

U.S. PATENT DOCUMENTS 5,610,974 A * 3/1997 Lantto ......................... 455/433
5,881,145 A * 3/1999 Giuhat et al. ........... 379/221.13
6,049,714 A * 4/2000 Patel .......................... 455/433

(Continued)

FOREIGN PATENT DOCUMENTS

EP    0 738 093 A2 * 10/1996

(Continued)

OTHER PUBLICATIONS

Digital Cellular Telecommunications System (Phase 2+) (GSM); Universal Mobile Telecommunications System (UMTS); Support of Mobile Number Portability (MNP); Technical Realisation; Stage 2 (3GPP TS 23.066 version 4.0.0 Release 4); ETSI TS 123 066 V4.0.0 (Mar. 2001).

(Continued)

*Primary Examiner*—Charles N. Appiah

(57) ABSTRACT

The invention provides an Intersystem Number Portability Register and a method for supporting number portability in an Intersystem Number Portability domain wherein subscribers are ported between different wireless networks based on likely different wireless systems. The Intersystem Number Portability Register is intended for use in a Number Portability resolving network, call originating or donor network, as well as for use in a recipient network. This Intersystem Number Portability Register comprise, and is intended for providing at request trouting data for home subscribers as well as for subscribers exported to, and for subscribers imported from, other wireless networks based on different wireless systems. Especially addressed to operators owning different networks based on different systems, this Intersystem Number Portability Register is extended to comprise routing data for home subscribers in different serving networks based in different wireless systems. Thereof, said operators owning different networks based on different systems may share a unique number portability database, the said Intersystem Number Portability Register, for supporting wireless number portability between said different networks based on different systems, that is, operating according to different system standards.

20 Claims, 6 Drawing Sheets

U.S. PATENT DOCUMENTS

| | | | |
|---|---|---|---|
| 6,064,887 A * | 5/2000 | Kallioniemi et al. | 455/445 |
| RE37,276 E * | 7/2001 | Lantto | 455/433 |
| 6,466,792 B1 * | 10/2002 | Copley | 455/445 |
| 6,529,595 B1 * | 3/2003 | Medhat et al. | 379/221.13 |
| 6,662,017 B1 * | 12/2003 | McCann et al. | 455/461 |
| 6,697,620 B1 * | 2/2004 | Lamb et al. | 455/432.1 |
| 6,735,621 B1 * | 5/2004 | Yoakum et al. | 709/218 |
| 6,738,633 B1 * | 5/2004 | Kim et al. | 455/461 |

FOREIGN PATENT DOCUMENTS

| | | |
|---|---|---|
| WO | WO 98/18269 | 4/1998 |
| WO | WO 99/01975 A1 * | 1/1999 |

OTHER PUBLICATIONS

TIA/EIA-41-D Enhancements for Wireless Number Portability Phase II, TIA/EIA/IS-756-A, Dec. 1998.

* cited by examiner

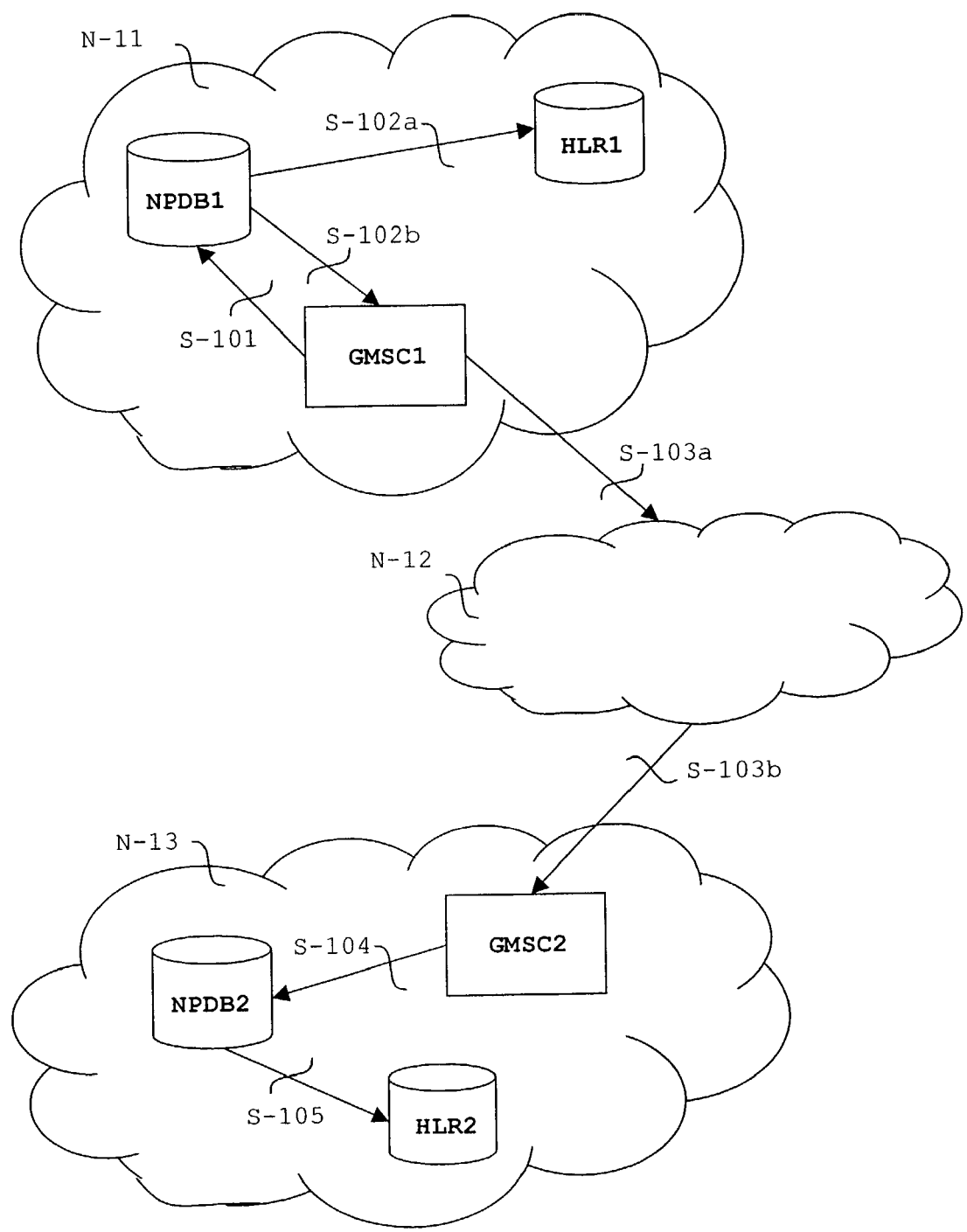
FIG.-1-
Related art

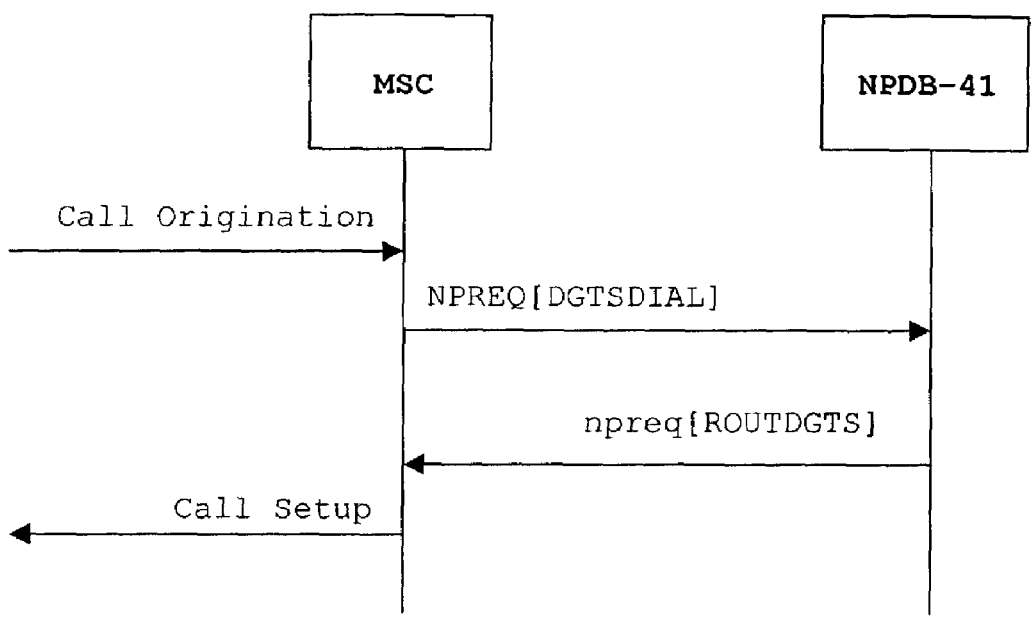
FIG.-2a-
Related art
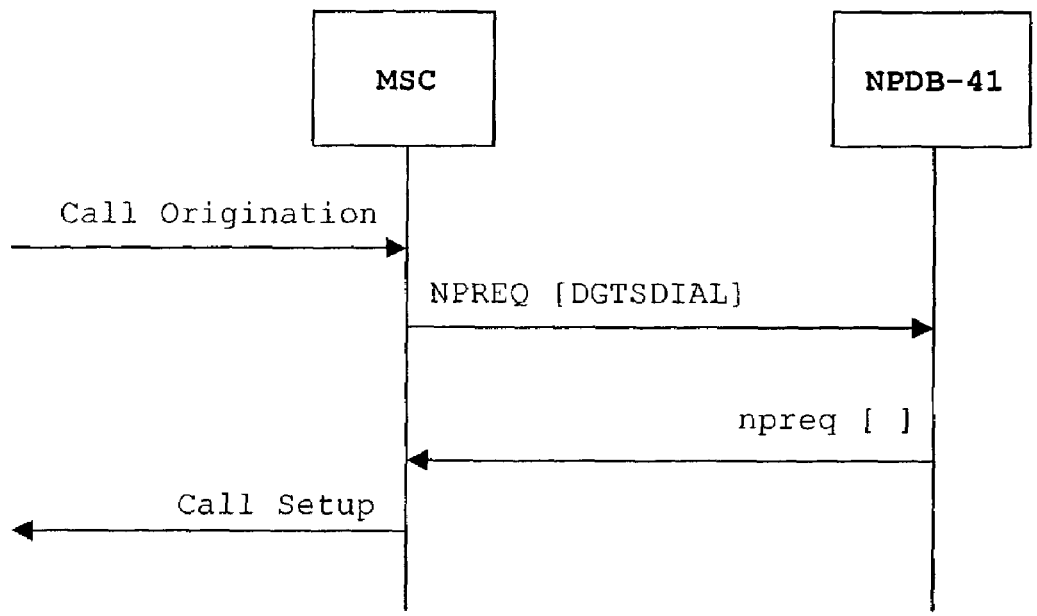
FIG.-2b-
Related art

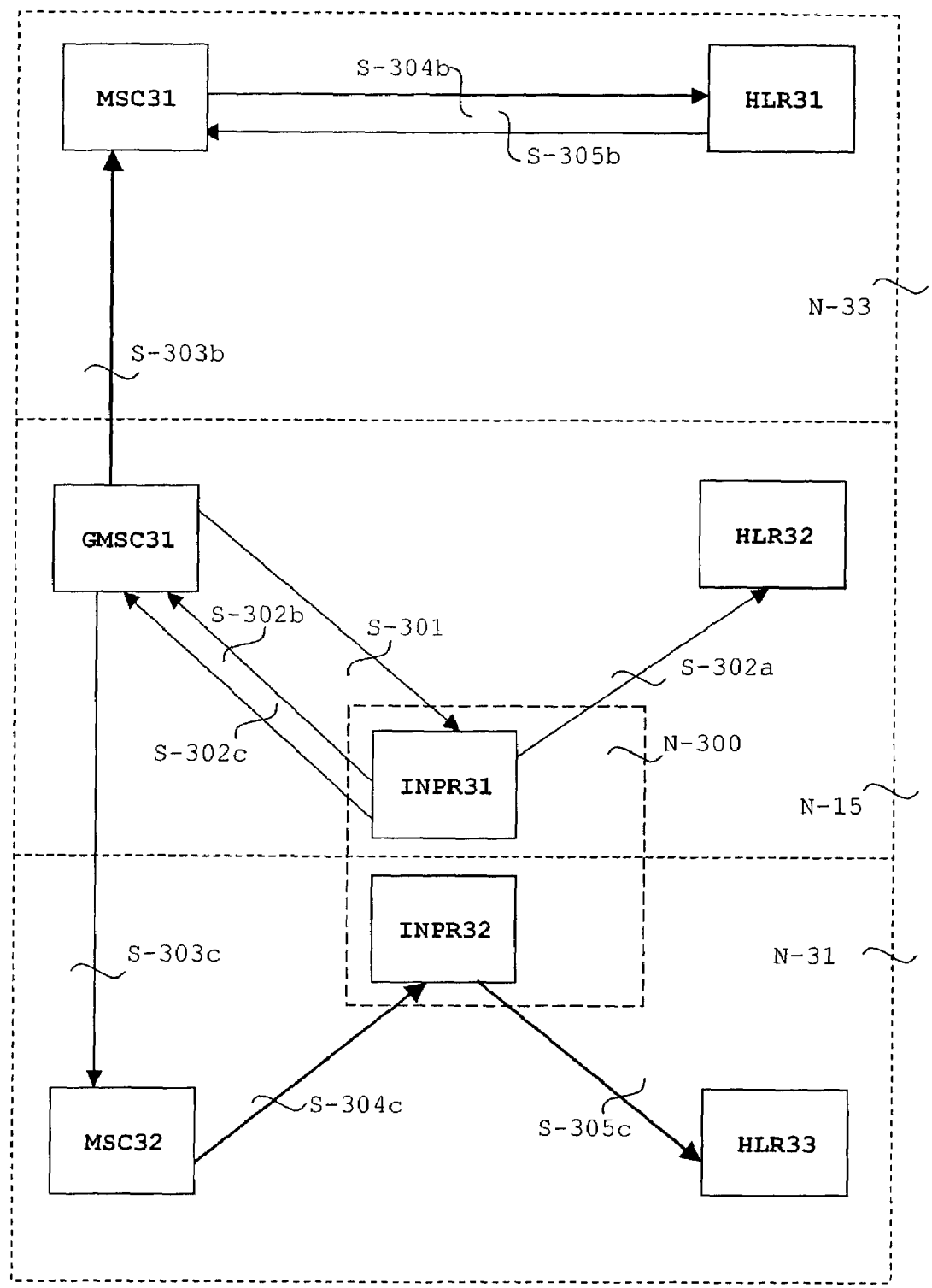
FIG.-3-

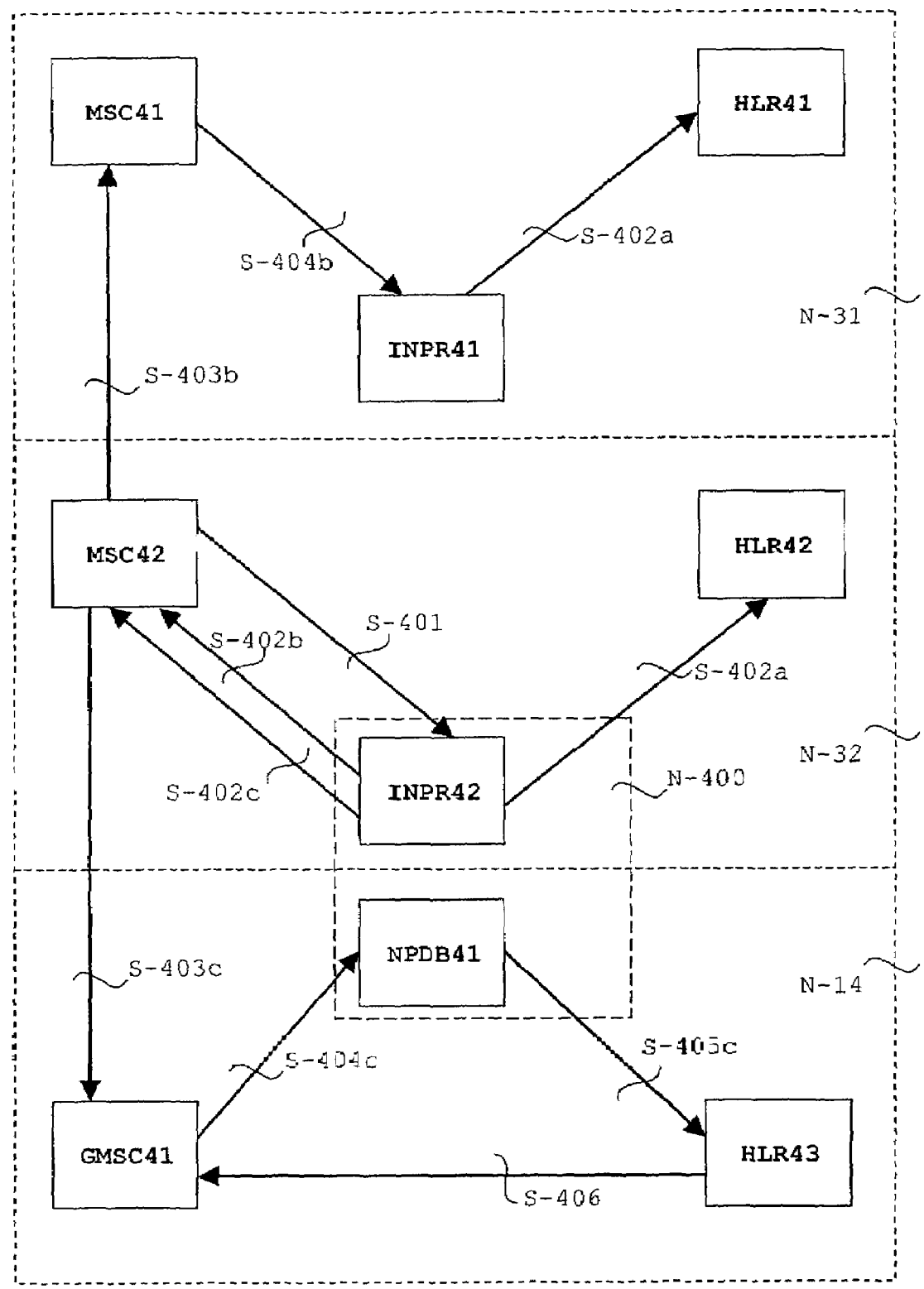
FIG.-4-

| NAI | ASF | TOA | GAP | | FCI (PNTI) |
|---|---|---|---|---|---|
| National significant Number | LRN | ... Ported Number | DN | ... | Translated |

(CdPA spans NAI and ASF)

FIG. -5a-

| NAI | ASF | | NPFI |
|---|---|---|---|
| Prefix Concatenated with DN | Prefix DN | ... | Queried & ported |

(CdPA spans NAI and ASF)

FIG. -5b-

| | CdPA | | | CDN | | | | |
|---|---|---|---|---|---|---|---|---|
| | NAI | ASF | | NAI | ASF | | NPFI | |
| ... | National significant Number | LRN | ... | National significant Number | DN | ... | Queried & ported | ... |

FIG. -6a-

| | CdPA | | | GN | | | | |
|---|---|---|---|---|---|---|---|---|
| | NAI | ASF | | NQI | ASF | | FCI (PNTI) | |
| ... | National significant Number | LRN | ... | Ported Number | DN | ... | Translated | ... |

NUMBER PORTABILITY RESOLVING APPARATUS

FIELD OF THE INVENTION

This invention generally relates to the provision of a Number Portability solution for subscribers that are ported between networks based on different systems and operating according to different standards. The invention further relates to Number Portability between networks operating according to Pan-American standards and networks operating according to Pan-European or Pan-Universal standards.

BACKGROUND

Number Portability is the ability for a mobile subscriber to change his or her mobile subscription network in the same country whilst retaining the original Directory Number. At present, a certain variety of solutions have turned up to solve Number Portability between different network operators within most of the existing wireless systems. Moreover, most of these wireless systems have achieved feasible solutions either standardized or, at least, compatible within a particular wireless system. However, when different types of wireless systems, namely systems based on different standards, are involved in the porting process there is no apparent solution yet. For example, number portability for subscribers being ported between operators of networks operating according to ANSI (American National Standards Institute)-41 and GSM (Global System for Mobile communications)/UMTS (Universal Mobile Telecommunication Standard), and vice versa, within the same country has not been completely solved yet. In this respect, notice that the solution presented in this document can be used for number portability between networks operating according to ANSI-41 and GSM/UMTS standards, that belong to the same operator or to different operators. For the latter case some rules for interconnection inside a country may be established by a Regulatory Body.

RELATED ART

As above mentioned, there are different instances of networks having solved the subscriber number portability within their own system.

A first instance may be encountered in networks based on a GSM system. Mobile Number Portability, hereinafter referred to as MNP, from GSM to GSM networks is the ability for a mobile subscriber to change his or her subscription from one GSM operator to another one within the same country whilst retaining the original directory number. A commonly spread solution for supporting MNP between GSM operators within a certain country takes into consideration routing issues, addressing or numbering principles, and applicable routing scenarios that can vary from different network operators and that are further commented in this description. Moreover, and accordingly with the ETSI (European Telecommunication Standard Institute), a new entity is defined in the GSM networks for maintaining subscriber data for own subscribers never ported, for own subscribers imported from other GSM network operators, and for exported subscribers to other GSM network operators. Said new entity is generally known as Number Portability Database in GSM systems, as referred to in 3G TS 23.066 v.4.0.0, published March 2001, and it is also responsible for carrying out specific procedures to solve the addressing required to reach said called subscriber at his or her current network.

Regarding routing issues in GSM systems, the SS7 (Signalling System number 7) network is configured at the SCCP (Signalling Connection Control Part) level to find the most suitable routing to reach a given destination based on the dialed number. Therefore, an extension of the routing procedures and number schemes exists in a GSM network being still able to find the given destination even though the called subscriber has been ported to another GSM network operator.

The addressing in GSM networks is based on Global Title analysis, and one of the main features to support Number Portability in GSM systems is the existence of particular prefixes on a per national operators basis. Said particular prefixes are agreed on, in length and meaning, among the GSM operators in a country likely, though not essentially, with a National Telecomm Regulatory body. In this respect, a particular prefix assigned to a particular GSM network operator is further used to route a call toward a subscriber ported to said particular GSM network operator. Therefore, new routing information is built up by concatenating said particular prefix identifying the current subscription network to the original subscriber Directory Number to be kept. Said subscriber Directory Number is the MSISDN (Mobile Subscriber ISDN number), which corresponds to an E.164 format, as described in ITU-T (International Telecommunication Union) Recommendation E.164, published May 1997, and it is the portable number as dialed by users. All the GSM networks, originating, destination and transit networks are able to understand, analyze and make it use of said new routing information.

A quite generic scenario for MNP between GSM networks is shown in FIG. 1, wherein the radio access and other network nodes not directly related with the invention are omitted for the sake of simplicity. This exemplary scenario may turn up when a call for a ported called subscriber is received at the Gateway Mobile Switching Center of the network that was originally assigned the called subscriber number series, namely the Gateway Mobile Switching Center of the so called donor network. Alternatively, this exemplary scenario may also turn up when a call for a ported called subscriber is received at the Gateway Mobile Switching Center of the originating network initiating the call, and said originating network can solve the number portability with its own NPDB containing routing data for all subscribers in the country. For the purpose of the present invention, at least, the resolution of MNP at the originating network is comparable to the resolution at the donor network. Thereby, all the explanations in this respect will be hereinafter referred to either the "MNP resolving" network, or to the "donor" network, indistinctly and in a non-restrictive manner.

As shown in FIG. 1, upon call reception at the MNP resolving network N-11, the Gateway Mobile Switching Center GMSC1 sends the MAP (Mobile Application Part) operation Send Routing Information S-101 to the Number Portability Database NPDB1 requesting routing data for the called subscriber, namely for a ported subscriber. This Send Routing Information S-101 message includes the MSISDN of the called subscriber, which is in fact the subscriber Directory Number, as part of the SCCP Global Title. The number portability database NPDB1 checks the MSISDN included in the Called Party Address at SCCP level to see whether it corresponds to an own subscriber or to a subscriber belonging to another network. Provided that said MSISDN corresponds to a Home subscriber or an Imported subscriber, the number portability database NPDB1 changes the called party address at SCCP level to appropriately point to the Home Location Register HLR1 in the Home network N-11. Then, the received send routing information with this new CdPA (Called Party Address) is relayed in a message S-102a from the number portability database NPDB1 towards said home location register HLR1, from where the signalling procedure goes on as in a normal GSM scenario without supporting number portability. However, if the MSISDN corresponds to an Exported subscriber currently belonging to another network operator, the number portability database NPDB1 builds up routing data for this subscriber by concatenating the prefix of the "recipient" network N-13, namely the network N-13 where the called subscriber currently holds his or her subscription, to the received MSISDN. Then, the answer for the received send routing information is sent back in a message S-102b to the gateway mobile services switching centre GMSC1 with said routing inside the 'roaming number' parameter. The prefix unambiguously identifies the current recipient destination network N-13 in charge of the ported subscriber and is further used to address said recipient destination network. Then, the gateway mobile services switching centre GMSC1 proceeds with the call, routing said call and submitting an ISUP (Integrated Services digital network User Part) IAM (Initial Address Message), likely through a transit network N-12, in a message S-103a. The transit network N-12 forwards the message S-103a as a message S-103b to the destination network N-13 by using said concatenation of prefix and MSISDN as the CdPA.

It has to be noticed that some specifications and technical literature like ITU-T Q.763, published June 2000, refer to Called Party Number whereas others like ITU-T Q.713, published July 1996, refer to Called Party Address. For the sake of simplicity, the term CdPA is used throughout this description to indistinctly refer to Called Party Number or to Called Party Address.

At the recipient destination network, the gateway mobile services switching centre GMSC2 recognises and takes off the prefix identifying his own network, and sends the SRI (Send Routing Information) MAP message S-104 towards the number portability database NPDB2 in said recipient destination network, including the called subscriber MSISDN inside the CdPA SCCP parameter. Upon recognition of this called subscriber as an Imported subscriber at said NPDB the SCCP CdPA is changed to appropriately point to the Home Location Register HLR2 in this recipient network. Then, the received SRI with this new CdPA is relayed in a message S-105 from the number portability database NPDB2 towards said HLR2 from where the signalling procedure goes on as in a normal GSM scenario.

In addition to the explanatory description for Number Portability, heretofore instanced under GSM system behaviour, the International Application WO 98/18269 shows manners to carry out Number Portability between mobile networks apparently operating according to the same standard or routing mechanisms. To this end, this international application proposes different routing. methods to reach a recipient mobile network for calls originated in fixed networks. Said routing methods may be based on a GMSC address, or based on a home location register address, and likely accompanied by the current IMSI (International Mobile Subscriber Identity) wherein these addresses are rather expressed in terms of a network routing prefix. However, the teaching of this application does not comprise information about the type of network the ported subscriber belongs to, or the specific routing mechanism to access a network of such a type. This information, type of network where the subscriber currently holds the subscription as well as the particular mechanism to access such a network, is found to be essential to support Number Portability between networks operating according to different standards and routing principles, and it is not apparently solved in this international application.

A second instance may be encountered in networks based on an ANSI-41 system, that is, operating according to ANSI standards like ANSI-41. Wireless Number Portability between ANSI-41 networks is the ability of wireless subscribers of said ANSI-41 network to retain the same telephone numbers when said wireless subscribers change from one ANSI-41 operator to another one. As for GSM MNP, any commonly spread solution for supporting WNP (Wireless Number Portability) between ANSI-41 operators within a certain country takes into consideration routing issues, addressing principles, and applicable routing scenarios that can vary from different ANSI-41 network operators. As for GSM, a new entity is proposed in an ANSI-41 "NP resolving" network for carrying out the necessary procedures to solve the addressing and, unlike GSM, for maintaining subscriber data for only those subscribers having been ported to another ANSI-41 network operator. Said new entity is also known and referred to as a Number Portability Database, hereinafter referred to as NPDB-41,in said ANSI-41 networks.

With regard to routing issues, the ANSI-41 networks also make it use of Signalling System number 7 to find the most suitable routing for accessing a given destination.

Unlike GSM, not only addressing schemes based on GT (Global Title), but also addressing schemes based on SPC (Signalling Point Code) and SSN (Subsystem Number), may be used for routing purposes when applying WNP in ANSI-41 networks. However, unlike GSM, the addressing used for WNP in ANSI-41 requires two separate addresses. On the one hand, there is the Directory Number with a meaning, similar to the one in GSM. On the other hand, the Location Routing Number, which is a 10-digit network routing address assigned to any particular switching node. In this ANSI-41 network approach, the aforementioned NPDB-41 at the number portability resolving network is requested to provide a valid location routing number for any particular subscriber ported to another ANSI-41 network in order to correctly route the call to the appropriate switching node at the destination recipient network. That is, the NPDB-41 at an ANSI-41 network maps every ported subscriber number to its corresponding serving switching node location routing number. Under this addressing principle, both location routing number and directory number are carried into two different fields in the applicable signalling messages. The address identifying the destination entity for the call, namely the location routing number, is used to effectively route the call, whereas the directory number is transparently carried in a separate signalling message parameter, and said directory number is only used at the destination entity to set up the call to the right subscriber. Typically, said directory number is transported in the generic address parameter of an initial address message according to the current specifications for ANSI ISUP. However, this situation can become a drawback for countries where the wireless system applications are purely operating according to ANSI-41 specifications whereas SS7 and more precisely ISUP are still operating according to older versions of ITU-ISUP where said generic address parameter does not exist.

Unlike GSM, the aforementioned location routing number approach with two separate addresses requires additional ISUP signalling information for communicating the query status in order to prevent subsequent switching nodes in the call path from making unnecessary database queries to the NPDB-41. To achieve this, a forward call indicator parameter is used in corresponding ANSI-ISUP signalling messages what implies modifications in switching nodes like a mobile services switching centre. More specifically, the modification has to do with the analysis of wireless number portability related parameters included in the initial address message ANSI-ISUP signalling messages. That is, the mobile services switching centre in charge of establishing the call at the originating network receives an initial address message with the dialed directory number included in the CdPA parameter, the CFI reset to indicate that no NPDB-41 query has been performed yet, and no applicable data in the generic address parameter field. Then, said mobile services switching centre interrogates the NPDB-41. The corresponding interrogation answer can result in a given location routing number along with the dialed directory number, provided that the subscriber is a ported subscriber to another IS-41 network, or such answer can indicate that the subscriber has not been ported elsewhere. For the former case, the mobile services switching centre prepares an initial address message ISUP message including the received location routing number in the CdPA parameter, including the dialed directory number in the generic address parameter field, and setting the forward call indicator field value to indicate that a wireless number portability query has been already performed. For the latter case, the mobile services switching centre prepares the initial address message as initially received and just sets the forward call indicator field value to indicate that a wireless number portability query has been already performed.

This initial address message ANSI-ISUP message is sent out and routed accordingly with CdPA field to the destination-switching node, namely a destination mobile services switching centre. Said destination mobile services switching centre assumes that it serves the dialed ported number by matching the location routing number received in the CdPA with its own location routing number. Upon this assumption, the MSC retrieves the dialed directory number from the GAP parameter. However, provided that the CdPA contents do not match the own location routing number at the destination mobile services switching centre and the CFI field is set, the mobile services switching centre can assume that the subscriber is not ported and that the CdPA contents are effectively the dialed directory number.

According to ANSI-41 related standards like the IS-756-A (Wireless Number Portability, Phase II) or the ANSI T1.122 (ANSI SCCP), the scenario for treatment of calls to solve portability basically turns up at the originating mobile services switching centre having received a Call Origination request as FIG. 2a and FIG. 2b show. Said mobile services switching centre MSC sends a Number Portability Request NPREQ, new proposed mobile application part operation, toward the NPDB-41 NPDB-41 in order to request a Location Routing Number for a portable called Directory Number. This new ANSI-41 related mobile application part operation is only used to request information for number portability, and its introduction due to wireless number portability requires modifications in mobile services switching centre nodes. As receiving said NPREQ at the NPDB-41 NPDB-41 the received subscriber directory number is checked. Provided that said directory number corresponds to a ported subscriber, the corresponding location routing number is returned back to the requester mobile services switching centre as shown in FIG. 2a. However, provided that said directory number corresponds to a non-ported subscriber, no location routing number parameter is returned back as shown in FIG. 2b. That is, the aforementioned standard specification assumes firstly that the query to the NPDB-41 NPDB-41 is done from the originating network and there is no need to maintain records for numbers that have not been ported. Any interested reader is referred to the standard specification IS-756-A for more information; and secondly, when the mobile services switching centre MSC is not able to obtain wireless number portability information from the NPDB-41 NPDB-41, said mobile services switching centre MSC will simply route the call based on the called number, namely the directory number.

In addition to the explanatory description for Number Portability, lately instanced under ANSI-41 system behaviour, the International Application WO 00/39981 shows manners to carry out Number Portability between ANSI-41 and data networks requiring routing of IP-addresses. More specifically, this application teaches the means and methods for obtaining as location routing number an address to reach an appropriate next gateway mobile services switching centre from where the final IP-address of a subscriber exported to a data network can be obtained. This teaching can be regarded as an extension of the current ANSI-41 generic principles and scenarios above stated for the ANSI-41 behaviour instanced. However, the teaching of this application, as it seems, does neither comprise information about the type of network the ported subscriber belongs to, nor the specific routing mechanism to access a network of such a type.

Still a further teaching could be read in the U.S. Pat. No. 6,049,714 (Mahesh), wherein Number Portability is solved in a sort of Intersystem Number Portability domain with help of a hierarchical database structure, specific registers interfacing the networks involved, and the essential participation of Intelligent Network related entities.

As a skilled reader can appreciate, the different mobile or wireless system instanced above cannot support Number Portability between them or versus any other similar system based on slightly different principles with its own particular system related NPDB and without involving Intelligent Network infrastructure. The main drawback derives from the different addressing principles: separate addresses versus concatenated prefix and address, from the different transport network capabilities: not only new ISUP versus older ISUP (ANSI or ITU) or vice versa, but also versus newer Internet based protocols in $3^{rd}$ Generation mobile systems like UMTS.

In this respect, it is an object of the present invention to provide the means and methods for supporting Intersystem Number Portability between different mobile or wireless systems with the only participation of said different mobile or wireless systems.

SUMMARY OF THE INVENTION

This object is solved advantageously by the apparatus of claim 1 and the methods of claims 9 and 10.

Further advantageous embodiments can be derived form the dependent claims.

The present invention provides a Number Portability resolving apparatus and methods to overcome said problem, that is, to support Number Portability in a so called Intersystem Number Portability Domain. Said Number Portability resolving apparatus, being compatible with both said different mobile or wireless system standards, may be used as a single Number Portability resolving apparatus within any or both of said first and second wireless networks to provide subscriber number portability data. Thus, said single NP resolving apparatus is, in accordance with the invention, capable of serving one or a combination of wireless networks, like for example a GSM system, an ANSI-41 system and any other newer $3^{rd}$ Generation mobile systems like UMTS, to support NP to and from each other.

The invention comprises a Number Portability resolving apparatus for use in a first wireless network operating according to a first wireless system standard, and which includes routing data for own subscribers never ported, subscribers exported to a further wireless network, and subscribers imported from a further wireless network, wherein said further wireless network operates according to the first wireless system standard. Said Number Portability resolving apparatus is arranged for comprising:

(a) routing data for subscribers exported to a second wireless network operating according to a second wireless system standard;

(b) indicators for determining whether this second wireless network follows a first or a second wireless system standard;

(c) storage arranged to contain on a per exported subscriber basis said routing data for subscribers exported to a second wireless network, and said indicators for determining whether this second wireless network operates according to a first or a second wireless system standard;

(d) protocol dealer for answering subscriber routing data related queries, originated from a first wireless network entity, with subscriber routing data appropriate to reach the exported subscriber in the second wireless network;

(e) routing data for subscribers imported from the second wireless network;

(f) indicators for determining whether the second wireless network operates according to the first or the second wireless system standard;

(g) storage arranged to contain on a per imported subscriber basis said routing data for subscribers imported from the second wireless network, and said indicators for determining whether the second wireless network operates according to the first or the second wireless system standard;

(h) protocol distributor for relaying subscriber routing data related queries, for subscribers imported from the second wireless network towards the corresponding home subscriber database at said first wireless network currently in charge of said imported subscribers;

wherein said first and second wireless system standards are different standards applying different routing mechanisms for supporting Number Portability.

The Number Portability resolving apparatus is further arranged to be configured for also serving the second wireless network, therefore said Number Portability resolving apparatus comprising:

(a) Indicators of served wireless networks and the correspondingly followed wireless system standards;

(b) Indicators of specific serving network on a per imported and per home subscriber basis;

(c) protocol dealer for answering subscriber routing data related queries, originated from a served wireless network entity, with subscriber routing data appropriate to reach the exported subscriber in a second wireless network operating according to a given wireless system standard; and (d) protocol distributor for relaying subscriber routing data related queries, originated from a served wireless network entity for home or imported subscribers, toward the corresponding home subscriber database at the specific served wireless network currently in charge of said home or imported subscribers.

The Number Portability resolving apparatus, which is called Intersystem Number Portability Register in the instant specification, is thus capable of serving one or a combination of wireless networks operating according to the same or different wireless system standards to support Number Portability to and from each other.

The invention also relates to a method in a wireless Number Portability domain, wherein subscribers are possibly ported between a first wireless network operating according to a first wireless system standard and a second wireless network. Said method including the steps of:

(a) issuing a subscriber routing data related query for a possibly ported subscriber from an entity preferably acting as a gateway;

(b) receiving a query for subscriber routing data at a Number Portability resolving apparatus in an Intersystem Number Portability Domain wherein the second wireless network operates according to the first or a second wireless system standard;

(c) checking at said Number Portability resolving apparatus whether the query relates to a subscriber exported to, or a subscriber imported from, the second wireless network operating according to the first or the second wireless system standard in order to respectively take one of the following actions:

(c1) answering a query for a subscriber exported to the second wireless network with routing data including indicators on whether said second wireless network follows the first or the second wireless system standard, or (c2) relaying the subscriber routing data related query, for a subscriber imported from a second wireless network operating according to the first or the second wireless system standard, toward the corresponding home subscriber database at the first wireless network currently in charge of said imported subscriber;

(d) distinguishing at the entity issuing the query, at reception of the answer in step (c1) including subscriber routing data, whether the second wireless network, currently in charge of the Exported subscriber, follows the first or the second wireless system standard; and (e) mapping the received routing data to the appropriate protocol message accordingly with the distinction made in step (d) in order to transfer the call to the corresponding recipient destination network;

wherein said first and second wireless system standards are different standards applying different routing mechanisms for supporting Number Portability.

Given that the Number Portability resolving apparatus might serve one or a combination of wireless networks likely operating according to different wireless system standards, the method further comprises the steps of:

(a) checking at said Number Portability resolving apparatus whether the received query for subscriber routing data relates to a Home or Imported subscriber in a serving wireless network, said serving wireless network being a so called first or second wireless network, both operating according to either a first or a second wireless system standard;

(b) relaying the subscriber routing data related query, for a Home or Imported subscriber in a serving wireless network, toward the corresponding home subscriber database at said serving wireless network with a protocol signalling message appropriate to said serving wireless network, wherein said serving wireless network follows a first or a second wireless system standard.

BRIEF DESCRIPTION OF DRAWINGS

The features, objects and advantages of the invention will become apparent by reading this description in conjunction with the accompanying drawings, in which:

FIG. 1 basically illustrates a simplified network view and relevant interfaces showing how Mobile Number Portability is currently carried out in GSM systems.

FIGS. 2a and 2b basically illustrate simplified block diagrams and relevant interfaces showing how Wireless Number Portability queries are carried out in ANSI-41 or equivalent based networks.

FIG. 3 presents a simplified network view with relevant entities and interfaces showing how Number Portability can be carried out for porting subscribers from a GSM system to an ANSI-41 system in accordance with embodiments of the invention.

FIG. 4 presents a simplified network view with relevant entities and interfaces showing how Number Portability can be carried out for porting subscribers from an ANSI-41 system to a GSM or UMTS system in accordance with embodiments of the invention.

FIG. 5a presents a simplified view of parameters relevant to number portability in a signalling message compliant to ANSI ISUP Standards as expected in some ANSI-41 network.

FIG. 5b presents a simplified view of parameters relevant to number portability in a signalling message compliant to ITU ISUP Standards as expected in a GSM network.

FIGS. 6a and 6b present simplified views of parameters relevant to number portability in a signalling message compliant to ITU ISUP Standards that in accordance with the invention may be expected in an ANSI-41, or in a GSM network, supporting Intersystem Number Portability.

DETAILED DESCRIPTION OF PREFERRED EMBODIMENTS

The following describes currently preferred embodiments of methods and apparatus to solve number portability between networks based on different standards like, preferably, GSM and ANSI-41. For the purpose of the present embodiments, and for the sake of clarity, references are only made to GSM instead of to Pan-European or Pan-Universal systems like UMTS networks. Moreover, in respect of the other network operating according to a different standard, references are only made to ANSI-41 instead of to any Pan-American network operating according to the American Standards for mobile communications.

In the following, the invention is described in relation with a first aspect of preferred embodiments to solve number portability in a scenario where the called subscriber has been ported from an ANSI-41 network to a GSM network. Further, the invention will be described in relation with a second aspect of preferred embodiments where the called subscriber has been ported from a GSM network to an ANSI-41 network. Both said aspects set the grounds for a so called Intersystem Number Portability Domain supported by specific methods and by an Intersystem Number Portability Register (hereinafter referred to as INPR).

In accordance with said first aspect, when a call is initiated for a called subscriber whose directory number corresponds to a certain donor ANSI-41 network, said call is received at the mobile services switching centre acting as a gateway of said donor network. As shown in FIG. 4 the mobile services switching centre MSC42 sends a Location Request MAP message S-401 toward the intersystem number portability register INPR42 at a donor ANSI-41 network N-32. The message S-401 includes the called subscriber directory number (dialled digits) inside the GT Address field of the CdPA and, optionally, inside the Digits parameter sent in the location request MAP message, namely at application level. The intersystem number portability register INPR42 analyses the dialled digits received either in the CdPA field at SCCP level or in the ANSI-41 location request MAP operation at application level, to see whether the subscriber belongs to said donor ANSI-41 network N-32, or to another recipient ANSI-41 network, or to a recipient GSM network.

Provided that the subscriber belongs to this donor ANSI-41 network N-32, a distinction can be done on whether said subscriber is a Home subscriber never ported elsewhere, or an Imported subscriber.

Notice that, accordingly with the aforementioned related art, wireless number portability is typically solved in an ANSI-41 originating network. Consequently, at this stage no number portability query is expected for a directory number corresponding to an Imported subscriber at the destination network. Then, the present case just applies to Home subscribers. In accordance with the current standards for wireless number portability in ANSI-41 networks, the NPDB just stores addressing information for "Exported" subscribers, and not for Home or Imported subscribers. Under this assumption, an ANSI-41 NPDB inquired about routing data for a Home subscriber can merely answer with an empty routing data field to indicate that the subscriber is not ported. The mobile services switching centre receiving such empty answer routes the call based on the called subscriber directory number in accordance with currently existing procedures.

However, an embodiment of the present invention proposes that an intersystem number portability register of an ANSI-41 network contains inputs not only for Exported subscribers but also for all other subscribers belonging to said ANSI-41 network, namely Home and Imported subscribers. Under this embodiment, the intersystem number portability register INPR42 inquired about routing data for a Home subscriber with the location request MAP operation can simply relay said MAP operation S-402a at SCCP level to the home location register HLR42 in charge of the corresponding directory number series and wherein the called subscriber is allocated. Also under this embodiment, the intersystem number portability register INPR42 inquired about routing data for an Imported subscriber with the location request MAP operation firstly obtains the specific home location register address in charge of said Imported subscriber from its own subscriber database. Then, the intersystem number portability register INPR42 changes the CdPA at said MAP operation to address said specific home location register, and further transmits said MAP operation S-402a to said specific home location register HLR42. This way of proceeding with Imported subscribers at the recipient network gives more freedom to recipient operator to re-allocate Imported subscribers in different home location registers without requiring successive updates at the donor network. Instead, the donor network just provides an address to access the recipient network whereas the latter, by inquiring its own intersystem number portability register, can access the home location register currently in charge of the Imported subscriber.

On the other hand, provided that the called subscriber is an Exported subscriber a distinction must be done on whether the recipient network is an ANSI-41 based network, or a GSM or UMTS based network. For the former, the intersystem number portability register INPR42 at a donor ANSI-41 network N-32 answers in a message S-402b with a location routing number addressing a switching node MSC41 at the recipient ANSI-41 network N-31 where the call should be routed, and also provides the same called subscriber number, namely directory number, as received in the query. In case that the recipient ANSI-41 network N-31 is equipped with an intersystem number portability register INPR41 arranged to support Exported, Home and Imported subscribers accordingly with a previous embodiment, said location routing number can correspond to said intersystem number portability register INPR41 address, being the recipient mobile services switching centre MSC41 interposed in the signalling path by appropriate routing tables. As receiving the intersystem number portability register INPR42 query answer S-402b at the donor ANSI-41 gateway mobile services switching centre MSC42, said gateway mobile services switching centre MSC42 checks the indicators received to determine the transport mechanisms suitable to reach the destination network, which for example may correspond to those drawn in FIG. 5a, or FIG. 6a, or FIG. 6b.

In this respect, it has to be noticed that FIG. 6a and FIG. 6b represent valid combinations of parameters relevant to number portability under Q.763 ITU Specifications. For example, the parameter NPFI (Number Portability Forward Information), referred to in FIG. 6a, may replace the FCI (Forward Call Indication) appearing in FIG. 6b, and vice versa. Nevertheless, spare bits should be specified for this FCI parameter aligned with the corresponding version for ANSI. Moreover, regarding other ITU related parameters candidate to carry the subscriber directory number in an ANSI environment, as the currently used generic address parameter in ANSI specifications, several alternatives may be suggested. A first alternative may be the use of the Called Directory Number CDN as shown in FIG. 6a. This parameter may be used with the Nature of Address Information NAI coded as "National significant Number" and the subscriber directory number fitting as many Address Signal Fields ASF as required. Another alternative may be the use of the Generic Number GN as shown in FIG. 6b, and with different sub-alternatives for coding of fields comprised in such parameter. A first sub-alternative for the generic number parameter is the use of spare codes in the Number Qualifier Indicator NQI field to indicate a ported subscriber directory number, whereas a second sub-alternative may be the use of the Nature of Address Information NAI field with a similar approach as for the called directory number CDN above. Consequently, the formats presented in FIG. 6a and FIG. 6b are mere suggestions of parameters and parameter fields that may be used in combination with a specific Called Party Address for routing mechanisms in an ANSI network where ITU-ISUP is used instead of ANSI-ISUP. That is, FIG. 6a and FIG. 6b, as well as FIG. 5a and FIG. 5b, are presented in broad and non-restrictive manner to show essential parts that characterise a particular mobile or wireless system operating according to particular standards, and for which specific indicators are provided in accordance with the present invention.

Further, said gateway mobile services switching centre MSC42 sends an initial address message, which for explanatory purposes is according to FIG. 5a, with the received location routing number in the CdPA field, the ported subscriber directory number in the generic address parameter field, and likely with the forward call indicator set to indicate that a wireless number portability query has been already performed. Said initial address message is routed through the SS7 network, namely SCCP routing tables, toward the destination recipient ANSI-41 network N-31. That is, appropriate routing tables will make the gateway mobile services switching centre MSC41 at the recipient ANSI-41 network N-31 receive said initial address message and check the received location routing number at the CdPA. Under the assumption above, this recipient ANSI-41 network includes an intersystem number portability register INPR41 arranged to support Exported, Home and Imported subscribers accordingly with a previous embodiment. Said mobile services switching centre MSC41 detects that the received location routing number corresponds to its own intersystem number portability register INPR41, and sends a new location request message S-404b to request routing data for the called ported subscriber. Such an intersystem number portability register finds the particular home location register HLR41 in charge of said called imported subscriber, changes the CdPA in the location request message to address said home location register HLR41, and transmits said location request message N-405b. Indeed, if such a recipient ANSI-41 network does not include an intersystem number portability register as described in previous embodiment, the receiver mobile services switching centre MSC41 behaves as currently specified by wireless number portability specifications and related art.

The latter case above distinguished, namely when the called subscriber at a donor ANSI-41 network N-32 is an Exported subscriber to a recipient GSM or UMTS based network N-14, is also given a particular solution in accordance with a preferred embodiment of the invention. This solution is of a special interest for operators having networks based on both systems. More specifically, for operators wanting to migrate Home subscribers of its own ANSI-41 network to its also own GSM network with an eye to a further upgrade of said GSM network to become a proper UMTS network. As shown in FIG. 4, when the intersystem number portability register INPR42 receives a location request S-401 requesting routing data for a called subscriber identified by a given directory number, said intersystem number portability register INPR42 checks routing data for said subscriber. Provided that said called subscriber is marked at the ANSI-41 intersystem number portability register INPR42 as an Exported subscriber to a recipient GSM network N-14, said intersystem number portability register INPR42 answers back N-402c to the requester mobile services switching centre MSC42 the expected routing information. This routing information comprising a prefix that unambiguously identifies the recipient GSM network N-14 followed by the received called subscriber directory number and indicators for selecting appropriate transport mechanisms. This answer from the intersystem number portability register INPR42 may preferably be a Location Request Response (hereinafter referred to as LocReqRes) wherein said routing information can be included inside the Destination_Digits parameter as if it were normal ANSI-41 routing data to further reach a Home subscriber roaming in another ANSI-41 network. As receiving said routing information, the requester gateway mobile services switching centre MSC42 at the donor ANSI-41 network N-32 checks the indicators received to determine the transport mechanisms suitable to reach the destination network N-41, which for example may correspond to those drawn in FIG. 5b, or FIG. 6a, or FIG. 6b. Further, said gateway mobile services switching centre MSC42, proceeds with the call by routing said call and submitting an initial address message S-403c, which for explanatory purposes is according to FIG. 5b, with a CdPA comprising the aforementioned prefix and the ported subscriber directory number to the recipient GSM network N-14. To achieve this, appropriate routing tables in the SS7 network are built up in order to unambiguously analysing the aforementioned prefix to reach the gateway mobile services switching centre GMSC41 that gives access to the recipient GSM network N-14.

The gateway mobile services switching centre GMSC41 receiving said initial address message at the recipient GSM network N-14, as recognising its own prefix in the CdPA parameter, takes off said prefix and just includes the received called subscriber directory number as CdPA of a MAP send routing information operation to be sent S-404c toward its own number portability database NPDB41. This interface between gateway mobile services switching centre GMSC41 and the number portability database NPDB41 as well as from said number portability database NPDB41 towards the home location register HLR43 in charge of the Imported subscriber is in accordance with the related art explained above and thus not part of the present invention.

In accordance with a said second aspect of preferred embodiments, when a call is initiated for a called subscriber whose directory number corresponds to a certain donor GSM network, said call is received at the gateway mobile services switching centre of the number portability resolving network, either said donor network or the originating network. As shown in FIG. 3, the gateway mobile services switching centre GMSC31 of the number portability resolving GSM network N-15 sends a send routing info MAP message S-301 to the intersystem number portability register INPR31. This message must include the directory number of the called subscriber in the SCCP Global Title Address inside the CdPA. Then, the intersystem number portability register INPR31 analyses the directory number received in the CdPA field at SCCP level, to see whether the subscriber belongs to a GSM network or to an ANSI-41 one. In case of a Home or Imported GSM subscriber, the message is relayed S-302a towards the correct home location register HLR32 where the subscriber is allocated and the procedure continues as usually done in GSM networks. On the other hand, in case of Exported subscriber to another GSM network, the existing procedures for GSM mobile number portability in a number portability database, already commented as related art and not further commented or shown in FIG. 3, or in an intersystem number portability register, apply. However, in case of an Exported subscriber to an ANSI network different alternatives turn up depending on the transport capabilities and architecture of said recipient ANSI-41 network. Provided that the recipient ANSI-41 network N-31 includes an intersystem number portability register INPR32 arranged to support Exported, Home and Imported subscribers accordingly with a previous embodiment, and said recipient ANSI-41 network supports newer versions of ITU-ISUP, the send routing information is answered S-302c with a prefixed directory number. This prefixed directory number may preferably be included inside the roaming number parameter. The prefix is used to point out the current subscription network and the message format shown in FIG. 5b may be used toward said ANSI-41 network according to the previous assumption. That is, the gateway mobile services switching centre GMSC31 proceeds with the call, by routing said call and submitting an ISUP initial address message S-303c, with CdPA comprising the aforementioned prefix and the ported subscriber directory number, to the ANSI-41 network N-31. Said initial address message is received at the ANSI mobile services switching centre MSC32 acting as a gateway of the recipient network. Said ANSI mobile services switching centre MSC32 detects the added prefix and, upon matching with the one currently assigned to its own network, takes said prefix off as preparing the sending S-304c of a MAP operation Location Request (LocReq) to the corresponding ANSI-41 intersystem number portability register INPR32. Said ANSI-41 intersystem number portability register INPR32 finds the ANSI-41 home location register HLR33 where the Imported subscriber is currently allocated and replaces the CdPA to relay said location request message S-305c toward said ANSI-41 home location register HLR33.

Said ANSI-41 home location register home location register HLR33 would provide the necessary ANSI related routing data for the ANSI-41 mobile services switching centre MSC32 to appropriately route the call toward the current subscriber roaming position, what is basically in accordance with the current procedures.

However, provided that the called subscriber is found to be in the intersystem number portability register INPR31 at the number portability resolving GSM network N-15 an Exported subscriber in a conventional ANSI-41 network N-33 not equipped with an intersystem number portability register, the send routing information is answered S-302b with routing information comprising a location routing number, the called subscriber directory number, and indicators intended for selection of appropriate transport mechanisms. The location routing number may be sent in the Roaming Number parameter as if the subscriber were a Home subscriber roaming in another GSM network. As receiving this routing information in the gateway mobile services switching centre GMSC31 at the number portability resolving GSM network, said gateway mobile services switching centre GMSC31 checks the indicators received to determine the transport mechanisms suitable to reach the destination network, which for example may correspond to those drawn in FIG. 5a, or FIG. 6a, or FIG. 6b. Said indicators are included in the intersystem number portability register in conformity with destination node capabilities, what may require a pure ANSI-ISUP, like that shown in FIG. 5a, to access the conventional ANSI-41 recipient network, or the adaptation of facilities introduced in newer ITU-ISUP versions like those shown in FIG. 6a or 6b.

Further, said gateway mobile services switching centre GMSC31 prepares an initial address message, which for explanatory purposes is according to FIG. 5a, being the received location routing number included in the CdPA whereas the called subscriber directory number is included in the generic address parameter field, and the forward call indicator parameter set to indicate that a wireless number portability query has been already performed. Said initial address message is addressed S-303b to the switching node, namely the mobile services switching centre MSC31, acting as a gateway at the recipient ANSI-41 network.

At receipt of such initial address message in said mobile services switching centre MSC31 the process continues as explained in the related art for wireless number portability in ANSI-41 networks. That is, by requesting S-304b routing data from the home location register HLR31 in charge of the Imported called subscriber, which in turn sends back the roaming data to reach said called subscriber.

A still further aspect of the present invention turns up in scenarios like those presented in FIGS. 3 and 4, wherein both number portability resolving and recipient networks, being these networks based on different standards like ANSI-41 and GSM/UMTS, belong to the same network operator. In accordance with this aspect of the present invention, a unique intersystem number portability register N-300; N-400 may be used to indistinctly serve both ANSI-41 and GSM/UMTS networks, respectively acting as number portability resolving and as recipient networks, and vice versa. Therefore, routing data for Home and Imported subscribers comprise, the latter irrespective of the type of the corresponding resolving network, indications arranged to identify the system in which the currently serving network is based on.

In a previous scenario wherein subscribers were ported from a donor GSM network N-15 to an ANSI-41 recipient network N-31, as presented in FIG. 3, Home subscribers in the donor GSM network are encountered in an extended intersystem number portability register N-300 with routing data comprising home network indicators identifying said GSM network. Besides, routing data at the ANSI-41 recipient network are also fetched from said extended intersystem number portability register N-300 wherein Imported subscribers are also given indications arranged to identify the ANSI-41 system in which the currently serving network is based on. Moreover, said extended intersystem number portability register N-300 also handles routing data for Imported subscribers in the GSM system and for Home subscribers in the ANSI-41 system, both comprising indicators respectively identifying GSM and ANSI-41 network as the serving donor and recipient network.

That is, with these new indicators the subscriber routing data previously handled in an intersystem number portability register IPNR31, INPR32 serving, and configured for, a unique network system, can now be handled in an extended INPR N-300 serving, and configured for, a plurality of network systems.

In another previous scenario wherein subscribers were ported from a donor ANSI-41 network N-32 toward a GSM recipient network N-14, as presented in FIG. 4, Home subscribers in the donor ANSI-41 network are encountered in an extended intersystem number portability register N-400 with routing data comprising home network indicators identifying said ANSI-41 network. Besides, routing data at the GSM recipient network are also fetched from said extended intersystem number portability register N-400 wherein Imported subscribers are also given indications arranged to identify the GSM system in which the currently serving network is based on. Moreover, said extended intersystem number portability register N-400 also handles routing data for Imported subscribers in the ANSI-41 system and for Home subscribers in the GSM system, both comprising indicators respectively identifying ANSI-41 and GSM network as the serving donor and recipient networks.

That is, with these new indicators the subscriber routing data previously handled in an intersystem number portability register INPR41, IPNR42 serving, and configured for, a unique network system, can now be handled in an extended intersystem number portability register N-400 serving, and configured for, a plurality of network systems.

Moreover, the extended intersystem number portability register N-300; N-400 presented in both previous scenarios of FIGS. 3 and 4, may correspond to the unique number portability resolving apparatus, object of the present invention, and comprising all related capabilities described under different aspects throughout these preferred embodiments.

The invention claimed is:

1. A number portability resolving apparatus in a first telecommunications network operating according to a first telecommunications system standard, further comprising:
   data record for storing:
   (a) subscriber data identifying those subscribers associated with said first telecommunications network, wherein said subscribers include own subscribers never ported from said first telecommunications network and subscribers ported to a second telecommunications network;
   (b) routing data associated with certain ones of said subscribers ported to a second telecommunications network;
   (c) indicator for determining a second telecommunications system standard according to which said second telecommunications network operates and for determining transport capabilities of said second telecommunications network; and
   protocol dealer for responding to a routing related query for a particular subscriber by providing said subscriber routing data and said indictor in response to a determination that said particular subscriber has been ported to said second telecommunications network.

2. The apparatus of claim 1 wherein said subscriber data further identifies certain ones of said subscribers ported from a third telecommunications network into said first telecommunications network and wherein said routing data includes muting data associated with said certain ones of said subscribers ported from said third telecommunications network into said first telecommunications network.

3. The apparatus of claim 2 wherein said indicator further determines a third telecommunications system standard according to which said third telecommunications network operates and for determining transport capabilities of said third telecommunications network.

4. The apparatus of claim 3 wherein said second telecommunications system standard and said third telecommunications system standard are same.

5. The apparatus of claim 3 wherein said first telecommunications network includes a subscriber database and said apparatus further comprises means for responding to a routing related query for a particular subscriber by identifying said subscriber database servicing said particular subscriber in response to a determination that said particular subscriber has been ported in from said third telecommunications network.

6. The apparatus of claim 1 wherein said compatible subscriber routing data further comprises a specific network entity address identifying said second telecommunications network and ported subscriber directory number.

7. The apparatus of claim 1 wherein said compatible subscriber routing data further comprises a specific prefix identifying said second telecommunications network concatenated with the ported subscriber directory number.

8. The apparatus of claim 1 wherein said first telecommunications network is compatible with the American National Standard Institute (ANSI) mobile standard.

9. The apparatus of claim 8 wherein said second telecommunications network is compatible with Global System for Mobile (GSM) standard.

10. A method for providing number portability within a telecommunications network, wherein one or mare subscribers have ported between a first telecommunications network and a second telecommunications network, the first telecommunications network operating according a first communication standard and the second telecommunications network operating according to a second communication standard, wherein the method comprises the steps of:

storing an indicator for determining said second communication standard according to which said second telecommunications network operates and for determining transport capabilities of said second telecommunications network;

receiving a subscriber routing data related query for a particular subscriber within said first telecommunications network;

determining whether said particular subscriber has been ported from said first telecommunications network to said second telecommunications network;

identifying the communication standard associated with said second telecommunications network end said transport capabilities by reviewing said stored indicator in response to the determination that said particular subscriber has ported to said second telecommunications network; and providing subscriber routing data addressable by said second telecommunications network with said transport capabilities in response to said determination.

11. The method of claim 10 wherein said step of receiving said subscriber routing data related query comprises receiving a Mobile Application Part (MAP) signal from a gateway mobile switching center GMSC) serving said first telecommunications network.

12. The method of claim 10 wherein said step of providing said subscriber routing data comprises providing routable address identifying a serving mobile switching center (MSC) within said second telecommunications network.

13. The method of claim 10 wherein said subscriber routing data further comprises a specific network entity address identifying said second telecommunications network and ported subscriber directory number.

14. The method of claim 10 wherein said subscriber routing data further comprises a specific prefix identifying said second telecommunications network concatenated with the ported subscriber directory number.

15. The method of claim 10 wherein said first telecommunications network is compatible with the American National Standard Institute.

16. The method of claim 15 wherein said second telecommunications network is compatible with the Global System for Mobile (GSM) standard.

17. An apparatus for providing number portability within a telecommunications network, wherein one or more subscribers have ported between a first telecommunications network and a second telecommunications network, the first telecommunications network operating according a first communication standard and the second telecommunications network operating according to a second communication standard, comprising:

means for storing an indicator for determining said second communication standard according to which said second telecommunication network operates and for determining transport capabilities of said second telecommunications network;

means for receiving a subscriber routing data related query for a particular subscriber within said first telecommunications network;

means for determining whether said particular subscriber has been ported from said first telecommunications network to said second telecommunications network;

means for identifying the communication standard associated with said second telecommunications network and said transport capabilities by reviewing said stored indicator in response to the determination that said particular subscriber has ported to said second telecommunications network; and means for providing subscriber routing data addressable by said second telecommunications network and said transport capabilities in response to said determination.

18. The apparatus of claim 17 wherein said means for receiving said subscriber routing data related query comprises receiving a Mobile Application Part (MAP) signal from a gateway mobile switching center (GMSC) serving said first telecommunications network.

19. The apparatus of claim 17 wherein said subscriber routing data further comprises a specific network entity address identifying said second telecommunications network and ported subscriber directory number.

20. The apparatus of claim 17 wherein said subscriber routing data further comprises a specific prefix identifying said second telecommunications network concatenated with the ported subscriber directory number.

* * * * *